(12) United States Patent
Allen-Ware et al.

(10) Patent No.: US 9,811,150 B2
(45) Date of Patent: Nov. 7, 2017

(54) SYSTEM AND METHOD FOR CONTROLLING IDLE STATE EXITS TO MANAGE DI/DT ISSUES

(71) Applicant: International Business Machines Corporation, Armonk, NY (US)

(72) Inventors: Malcolm S. Allen-Ware, Tucson, AZ (US); Alan James Drake, Austin, TX (US); Michael Stephen Floyd, Cedar Park, TX (US); Charles Robert Lefurgy, Austin, TX (US); Karthick Rajamani, Austin, TX (US); Tobias Webel, Schwaebisch Gmuend (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/937,290

(22) Filed: Nov. 10, 2015

(65) Prior Publication Data

US 2016/0132096 A1    May 12, 2016

(30) Foreign Application Priority Data

Nov. 11, 2014    (GB) .................................. 1420013.3

(51) Int. Cl.
*G06F 1/32* (2006.01)
*G06F 1/26* (2006.01)
*G06F 9/44* (2006.01)

(52) U.S. Cl.
CPC .............. *G06F 1/3287* (2013.01); *G06F 1/26* (2013.01); *G06F 9/4418* (2013.01); *Y02B 60/1282* (2013.01)

(58) Field of Classification Search
CPC .. G06F 11/3466; G06F 1/3206; G06F 1/3243; G06F 1/26; G06F 1/3287; G06F 9/4418; G06F 1/3234
(Continued)

(56) References Cited

U.S. PATENT DOCUMENTS 7,607,028 B2 * 10/2009 Douriet ..................... G06F 1/26
                                                            713/300
7,777,461 B2 *  8/2010 Martin ................ H02M 3/1584
                                                            323/272

(Continued)

OTHER PUBLICATIONS

Kim, Y., "Characterization and Management of Voltage Noise in Multi-Core, Multi-Threaded Processors", Dissertation presented to the Faculty of the Graduate School of the University of Texas at Austin, May 2013, pp. 1-155.

(Continued)

*Primary Examiner* — Thomas Lee
*Assistant Examiner* — Santosh R Poudel
(74) *Attorney, Agent, or Firm* — Fleit Gibbons Gutman Bongini Bianco PL; Thomas S. Grzesik

(57) ABSTRACT

A method for managing a processor, the processor comprising a common supply rail and processor cores being connected to the common supply rail, wherein each processor core comprises a core unit, wherein the method comprises detecting idle state exits indicated by the core units; and delaying a command execution of at least one of the core units indicating an idle state exit when the number of idle state exits exceeds a predetermined threshold idle state exit number may reduce voltage droops due to several processor cores leaving the idle state at the same time.

17 Claims, 8 Drawing Sheets

(58) Field of Classification Search
USPC .......................................................... 713/323
See application file for complete search history.

(56) References Cited

U.S. PATENT DOCUMENTS

| | | | | |
|---|---|---|---|---|
| 7,937,563 | B2* | 5/2011 | Naffziger | G06F 1/3203 |
| | | | | 712/214 |
| 2005/0171709 | A1* | 8/2005 | Nortier | E03B 7/071 |
| | | | | 702/45 |
| 2006/0044931 | A1* | 3/2006 | Kim | G11C 7/1012 |
| | | | | 365/189.14 |
| 2007/0283172 | A1* | 12/2007 | Douriet | G06F 1/26 |
| | | | | 713/300 |
| 2008/0141062 | A1 | 6/2008 | Yamaoka | |
| 2009/0072885 | A1 | 3/2009 | Kawasaki | |
| 2009/0300329 | A1* | 12/2009 | Naffziger | G06F 1/3203 |
| | | | | 712/205 |
| 2011/0296212 | A1* | 12/2011 | Elnozahy | G06F 1/3203 |
| | | | | 713/320 |
| 2012/0144221 | A1* | 6/2012 | Naffziger | G06F 1/3203 |
| | | | | 713/340 |
| 2012/0166854 | A1 | 6/2012 | Rotem et al. | |
| 2012/0254641 | A1* | 10/2012 | Rotem | G06F 1/28 |
| | | | | 713/320 |
| 2013/0047011 | A1* | 2/2013 | Dice | G06F 9/485 |
| | | | | 713/320 |
| 2013/0151784 | A1* | 6/2013 | Bell, Jr. | G06F 12/0815 |
| | | | | 711/133 |
| 2013/0196709 | A1* | 8/2013 | Nho | G06F 1/324 |
| | | | | 455/550.1 |
| 2014/0100706 | A1* | 4/2014 | Khatri | G06F 1/324 |
| | | | | 700/297 |
| 2014/0101471 | A1* | 4/2014 | Bieswanger | G06F 1/3206 |
| | | | | 713/322 |
| 2014/0157277 | A1* | 6/2014 | Eisen | G06F 1/26 |
| | | | | 718/102 |
| 2014/0181537 | A1 | 6/2014 | Manne et al. | |
| 2014/0181554 | A1* | 6/2014 | Manne | G06F 1/3234 |
| | | | | 713/323 |
| 2014/0317422 | A1* | 10/2014 | Rosenzweig | G06F 1/3206 |
| | | | | 713/300 |
| 2015/0058650 | A1* | 2/2015 | Varma | G06F 1/3293 |
| | | | | 713/324 |
| 2015/0121057 | A1* | 4/2015 | Arora | G06F 1/3228 |
| | | | | 713/100 |

OTHER PUBLICATIONS

Hu, X., et al., "Orchestrator: A low-cost solution to reduce voltage emergencies for multi-threaded applications", Design Automation & Test in Europe Conference & Exhibition, Mar. 18-22, 2013, pp. 1-7.

Zhao, J., et al., "Thermal-aware Voltage Droop Compensation for Multi-core Architectures", Proceedings of the Great Lakes Symposium on VLSI, May 16-18, 2010, pp. 1-6.

Great Britain Search Report dated Jun. 8, 2015 received for British patent application No. GB1420013.3.

* cited by examiner

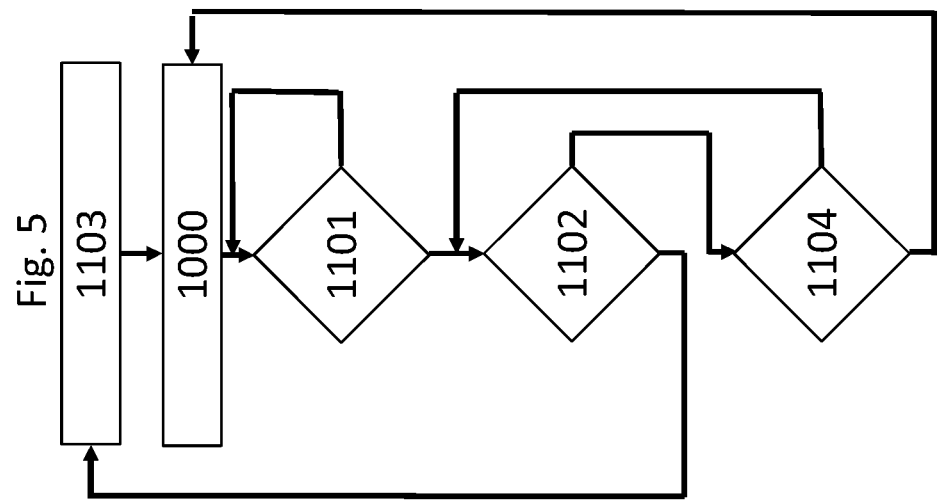
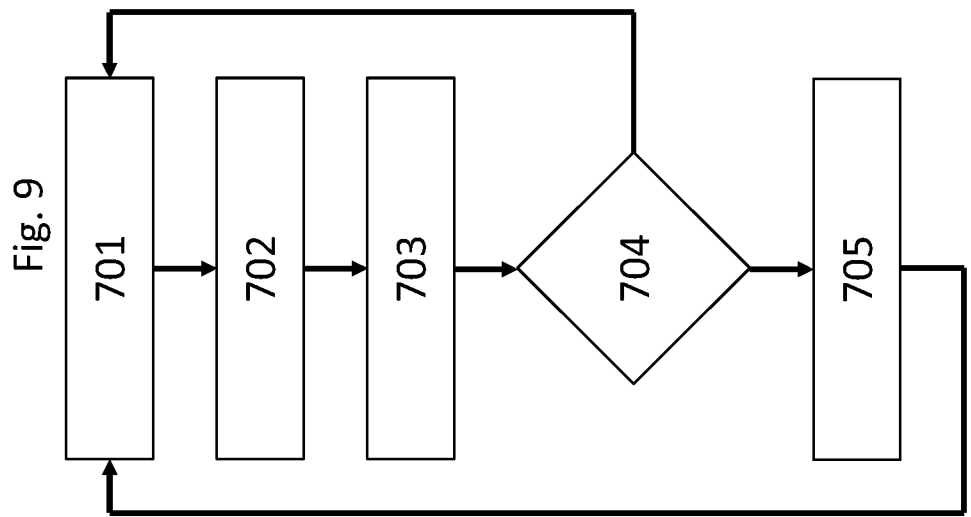

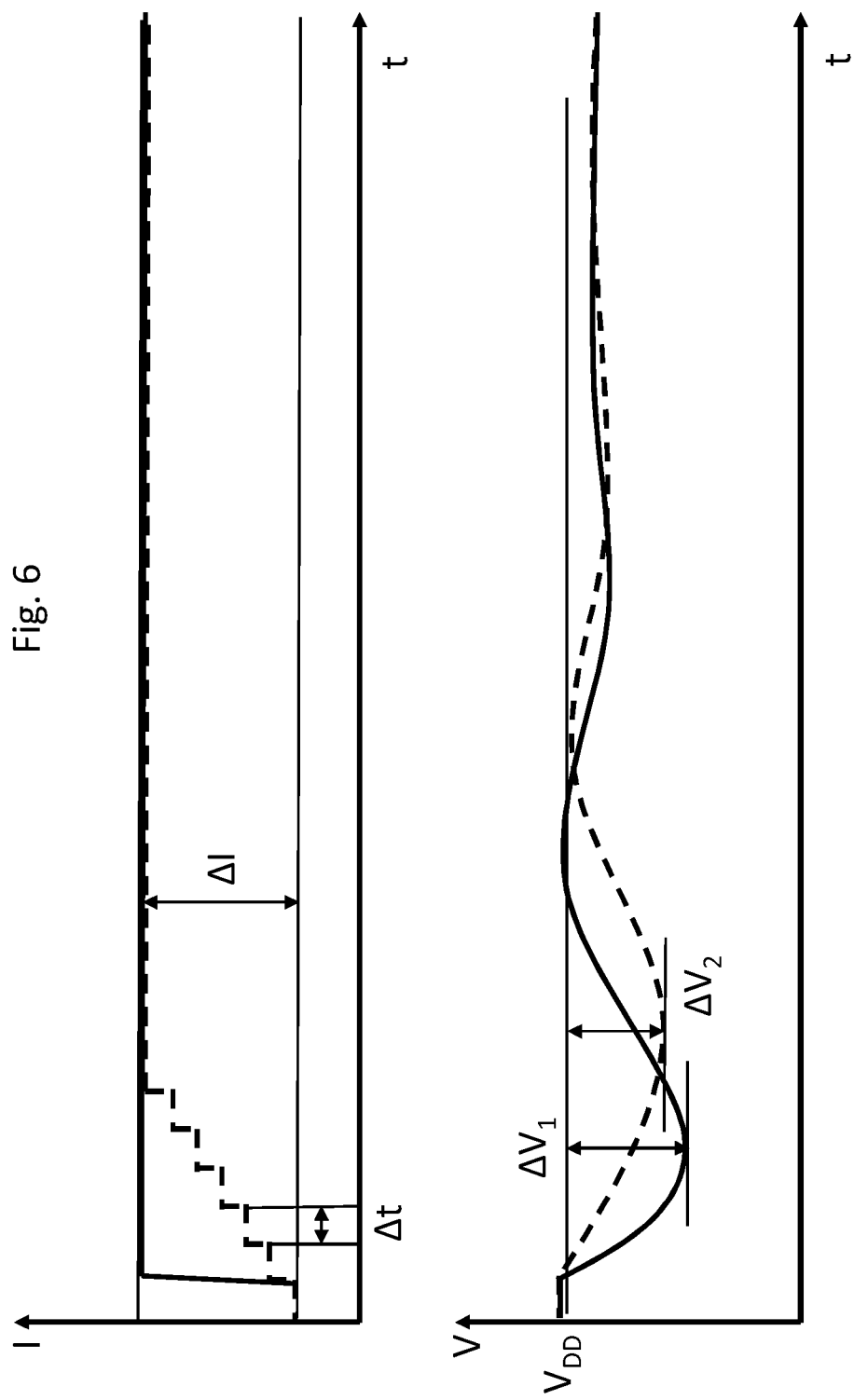

| Perf. | Perf. [%] | Suspend pattern |
|---|---|---|
| 16/16 | 100.00 | 00 00 00 00 00 00 00 00 |
| 15/16 | 93.75 | 10 00 00 00 00 00 00 00 |
| 14/16 | 87.50 | 10 00 00 00 10 00 00 00 |
| 13/16 | 81.25 | 11 00 00 00 10 00 00 00 |
| 12/16 | 75.00 | 11 00 00 00 11 00 00 00 |
| 11/16 | 68.75 | 11 10 00 00 11 00 00 00 |
| 10/16 | 62.50 | 11 10 00 00 11 10 00 00 |
| 9/16 | 56.25 | 11 11 00 00 11 10 00 00 |
| 8/16 | 50.00 | 11 11 00 00 11 11 00 00 |
| 7/16 | 43.75 | 11 11 10 00 11 11 00 00 |
| 6/16 | 37.5 | 11 11 10 00 11 11 10 00 |
| 5/16 | 31.25 | 11 11 11 00 11 11 10 00 |
| 4/16 | 25.00 | 11 11 11 00 11 11 11 00 |
| 3/16 | 18.75 | 11 11 11 10 11 11 11 00 |
| 2/16 | 12.50 | 11 11 11 10 11 11 11 10 |
| 1/16 | 6.25 | 11 11 11 11 11 11 11 10 |
| 0/16 | 0.00 | 11 11 11 11 11 11 11 11 |

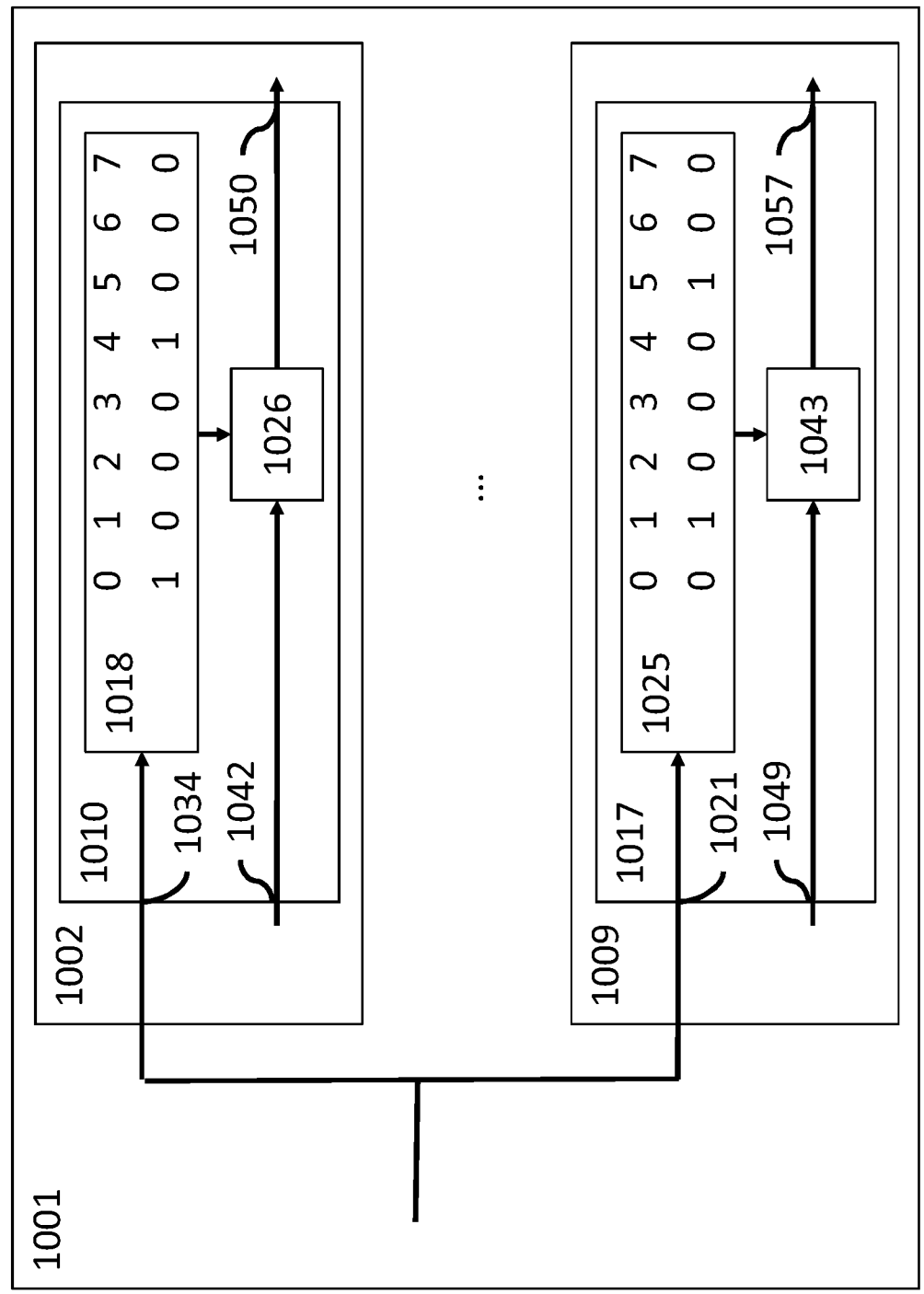

SYSTEM AND METHOD FOR CONTROLLING IDLE STATE EXITS TO MANAGE DI/DT ISSUES

STATEMENT REGARDING FEDERALLY SPONSORED RESEARCH OR DEVELOPMENT

This invention was made with Government support under Contract No.: HR0011-13-C-0022, awarded by DARPA. The Government has certain rights in this invention.

BACKGROUND

The embodiment of the invention relates generally to reducing power grid noise in a processor and particularly to reducing power grid noise in a processor while minimizing performance loss.

In high performance processors or other integrated circuits (ICs), to increase the processing performance of the processor, the processor chip design typically includes one or more of one or more processor cores and one or more pipelines connecting the processor cores. In addition, in a high performance system, processor system designs often include multiple chips sharing a common supply rail of a power distribution network providing a supply voltage. As the number of processor cores on a same chip or across multiple chips, all sharing a common supply rail, increases, the number of circuits that switch per clock cycle also increases.

In a processor there is noise generated by circuit switching activity at each clock cycle by nodes, busses, and other circuit components sharing a common supply rail. One result of noise generated by circuit switching activity, also referred to as power grid noise or di/dt noise, is that a sudden increase in noise will induce a droop in the supply voltage to the common supply rail of the power distribution network. A sudden, large droop in the supply voltage slows down the circuit response and therefore could cause timing errors on the logical circuit.

To reduce the noise generated by circuit switching activity, a processor may include decoupling capacitors positioned near the switching circuits of the processor cores, where the decoupling capacitors act as a charge reservoir and help reduce noise on the power distribution network as circuit switching activity increases. The supply voltage droop $\Delta V$ induced by an increase in circuit switching activity at the chip level is proportional to $\Delta I \, \mathrm{sqrt}(L/C)$, where $\Delta I$ is the increase in current required by chip level switching circuits on the common supply rail, L is the inductance from the chip level circuits to printed-circuit-board or package level, and C is the summed chip level capacitance of the circuits on the common supply rail. Since many cores can be activated simultaneously, one limitation of implementing decoupling capacitors to reduce noise is in the case where there is a sudden burst of activity on one or more processor cores, increasing the current, and because $\Delta I$ is directly proportional to the number of cores on the common supply rail, the sudden increase in $\Delta I$ outweighs the noise reduction by the charge reservoirs of the decoupling capacitors, triggering a voltage droop. The risk for such a voltage droop is particularly high if several processor cores are leaving an idle state at the same time.

To address this problem US 2014/0181554 A1 proposes a multi-core data processor including multiple data processor cores each having a power state controller and a circuit connected to the data processor cores. An operating system causes processor cores to enter an idle state if a barrier for a thread run by the respective processor core encounters a barrier and keeps track of the idle states of the processor cores. The circuit of the known multi-core data processor provides a control signal in response to power states of multiple data processor cores. Only in response to a release signal each power state controller changes the power state from an idle state to an active state in dependence on the control signal.

BRIEF SUMMARY

In view of the foregoing, there may be a need for an improved processor and method for reducing power grid noise to reduce any voltage droop, while minimizing performance loss, in a processor system with multiple processor cores sharing a common supply rail.

According to a first aspect, the invention relates to a method for managing a processor, the processor comprising a common supply rail and processor cores being connected to the common supply rail, wherein each processor core comprises a core unit, wherein the method comprises detecting idle state exits indicated by the core units and delaying a command execution of at least one of the core units indicating an idle state exit when the number of idle state exits exceeds a predetermined threshold idle state exit number.

According to a second aspect, the invention relates to a processor adapted to the method.

BRIEF DESCRIPTION OF THE SEVERAL VIEWS OF THE DRAWINGS

In the drawings:

FIG. 5 shows an embodiment of a method for managing a processor;

FIG. 6 shows an exemplary common supply rail behaviour;

FIG. 9 shows an embodiment of a method for managing a processor; and

FIG. 10 shows an embodiment of a processor.

DETAILED DESCRIPTION

Figure 1:
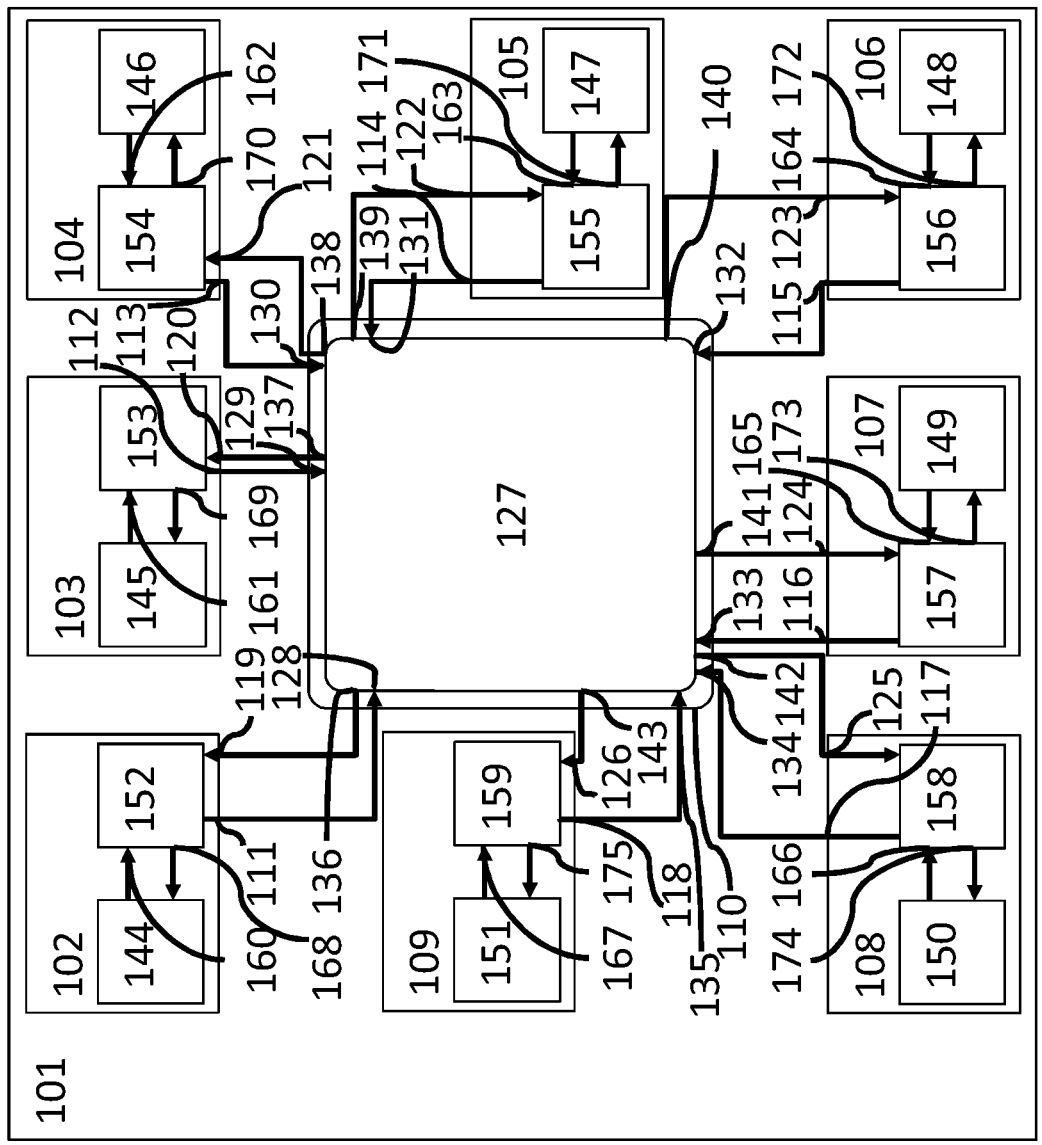
FIG. 1 shows an embodiment of a processor.

A method for managing a processor, the processor comprising a common supply rail and processor cores being connected to the common supply rail, wherein each processor core comprises a core unit, is provided, wherein the method comprises detecting idle state exits indicated by the core units and delaying a command execution of at least one of the core units indicating an idle state exit when the number of idle state exits exceeds predetermined threshold idle state exit number. An idle state exit may indicate that a core unit will leave the idle state or that a core unit has left the idle state. An idle state can be defined as a state where there is no activity of the core unit or the activity of the core unit is below a certain programmable threshold. The activity level may be measured in terms of one or more events within a specific interval. The threshold(s) may be on each of the events or on a measure made up of a combination of the events, e.g., a weighted sum of the event counts.

In a first embodiment of the method, detecting idle state exits indicated by the core units comprises detecting idle state exits indicated by the core units within a window of a predetermined number of clock cycles and delaying a command execution of at least one of the core units indicating an idle state exit within the window when the number of idle state exits exceeds a predetermined threshold idle state exit number. Typically, the window may comprise several clock cycles, i.e. more than one clock cycle. Said embodiment may allow for reducing voltage droops when several processor cores leave or have left the idle state slightly offset from one another. However, the window may also comprise only one clock cycle. Detecting processor cores leaving or having left the idle state at the very same clock cycle may allow for particularly fast counter-measures.

In a further embodiment, the method comprises detecting idle state exits indicated by the core units within a consecutive window of the predetermined number of clock cycles and delaying a command execution of at least one of the core units indicating an idle state exit within the consecutive window when the number of idle state exits exceeds a predetermined threshold idle state exit number. Providing a consecutive window which is shifted by some clock cycles from the window referred to above may help to detect more situations, which may lead to a voltage droop. For example, it may happen that an amount of core units are leaving or have left the idle state, which may lead to a severe voltage droop. However, some of the core units indicate an idle state exit at the end of the window and others at the beginning of the next window. Hence, in each window the number of detected idle states exits may be too low to lead to a command execution delay. Providing a consecutive window shifter with respect to the window may help to avoid such a situation. For this purpose, it is also possible to provide more than one, in particular five, consecutive windows.

Moreover, in an embodiment of the method, delaying comprises throttling the command execution. Throttling the command execution may indicate that the command execution is started immediately but the command is processed more slowly. The core unit may, for example, be operated with a lower frequency. Such a method may be implemented more easily in existing processor layouts.

In a further embodiment of the method, delaying comprises postponing the command execution. Postponing the command execution may indicate that processing of the command is not started immediately but after a certain time. Said embodiment may avoid large voltage droops before they occur.

Further, in an embodiment, the method comprises determining for each processor core if the processor core is in an idle state, delaying the command execution of the at least one of the core units indicating an idle state exit when the number of idle state exits exceeds a predetermined threshold if the processor is in the armed mode, and leaving the armed mode if less than a predefined number of processor cores is in an idle state. Providing an armed mode may allow for delaying the command execution only when there is really a risk for voltage droops.

In another embodiment, the processor comprises a common supply rail, processor cores sharing the common supply rail and comprising outputs for outputting idle state values and inputs for inputting a core throttling signal.

Further, in an embodiment, the processor core comprises a core power management logic, wherein the core power management logic comprises inputs for inputting S1 core events, an idle state detecting unit receiving S6 of the S1 core events and adapted to emit a signal if none of the S6 core events has occurred. Hence, an idle state exit may be determined using core events already used for other purposes.

In another embodiment, the core power management logic comprises a configurable idle state exit register for turning on or off outputting an idle state value. This may allow for deactivating an idle state value handling for a specific processor core.

Moreover, in an embodiment, the core power management logic comprises an idle state counter for summing up the signal for a predetermined number of cycles. This may allow for reducing the frequency of signals to be transferred to a unit handling the idle state signals.

In another embodiment, the processor comprises a chip power management unit, wherein the chip power management unit comprises inputs for inputting idle state values, a control unit for outputting an idle state throttling signal based on the idle state values and outputs for outputting core throttling signals to the processor cores. Thus, processing of the idle state values may be handled by a central unit and reconfiguration must not be made for every single processor core.

In another embodiment, the chip power management unit comprises a detecting unit for detecting a first idle state exit, a window counter and a summing unit for summing idle state exits during the window.

Furthermore, in an embodiment, the processor comprises an idle state exit register and adding units for activating and deactivating a throttling mechanism due to idle state exits.

In another embodiment, a processor comprises a common supply rail, at least two processor cores, wherein the at least two processor cores are connected to the common supply rail, wherein the at least two processor core comprise core power management units comprising a mask register, a decision unit, an input for inputting an idle state exit, an input for a common clock signal, an output for outputting a resume signal. Said processor may allow coping with idle state exits as fast as possible and may allow avoiding voltage droops due to idle state exits proactively.

In an embodiment, a processor comprising a common supply rail, two or more processor cores, wherein the one or more processor cores share the common supply rail, is provided, wherein each of the two or more processor cores comprises an output for outputting a core dIPC value and an input for inputting a core throttling signal, and a chip power management logic, in particular separate from the one or more processor cores, wherein the chip power management logic comprises at least two inputs for inputting the core dIPC values, a threshold register for registering a dIPC threshold value, a chip dIPC register for registering a current global dIPC value derived from the at least two core dIPC values, at least one chip dIPC history register for registering a historic global dIPC value, a subtractor providing an absolute difference of an average historic global dIPC derived from the historic global dIPC value and the current global dIPC value, a magnitude comparator providing a throttling signal when the absolute difference is above the dIPC threshold value, at least two throttling OR gates outputting core throttling signals in response to receiving a throttling signal and/or an add execution delay signal, at least two outputs for outputting the core throttling signals to the at least two processor cores when the throttling signal and/or the add execution delay signal.

In a further embodiment of the processor, the chip power management logic further comprises a first adder providing the current global dIPC value as a sum of the core dIPC values. Adding the core dIPC values of the multiple cores together may allow for a better mitigation of voltage droops due to parallel busy processor cores.

Further, in an embodiment of the processor, the chip power management logic comprises only one historic global dIPC register and the average historic global dIPC value is identical to the at least one historic global dIPC value. Using only one historic global dIPC value may be a particularly simple measure for reducing power grid noise.

According to another embodiment of the processor, the chip power management logic comprises S5 greater one historic global dIPC registers, a second adder summing the S5 historic global dIPC values, a chip dIPC history register for registering the sum of the S5 historic global dIPC values and a divisor for providing the average historic global dIPC value as sum of the S5 historic global dIPC values divided by S5. Hence, voltage droops may be better mitigated when not all processor cores perform current consuming operations at exactly the same time, but with a slight offset to one another.

Moreover, in an embodiment of the processor, the threshold register is fixed. A fixed threshold may be less complex and may pose fewer constraints to the hardware implementation.

In another embodiment, the threshold register is configurable. Hence, the threshold may be adapted to the purpose of the chip. The voltage droops experienced in praxis may be different from the theoretically calculated ones. Thus, the possibility to adapt the threshold may be advantageous.

According to a further embodiment of the processor, the processor core comprises a core power management logic, wherein the core power management logic comprises an input for inputting at least one core event, an input for receiving a core throttling signal, an output for outputting a core dIPC value derived from the at least one core event, a power throttling unit for generating a sequence of suspend signals upon receipt of a throttling signal, an output for outputting a suspend pattern. Providing a core power management logic at the processor core level and a chip power management logic at the processor chip level may be advantageous as processor core specific power management may be handled on processor core level very fast and at the same time the power management can also be adapted to the power consumption of all processor cores.

Moreover, in an embodiment of the processor, the core power management logic comprises an input for inputting S1 core events, a selector for selecting S2 of the S1 core events, an adder for adding the S2 core events and to obtain a dIPC core cycle value, a dIPC core cycle register for storing the dIPC core cycle value, and wherein the core dIPC value is derived from the dIPC core cycle value. Said embodiment may allow selecting only the core events having a strong impact on power consumption. Less important events may be disregarded. Avoiding further processing of less important events may result in a less complex chip design.

In another embodiment of the processor, the core power management logic comprises an adder for summing the dIPC core cycle value over a predetermined number of cycle times S3, and a core dIPC value register for storing the sum of the S3 dIPC core cycle values, and wherein the core dIPC value is derived from the sum of the S3 dIPC core cycle values. Hence, the time frame, in which the core events are monitored, may be adapted to the needs.

Further, in an embodiment of the processor, the core power management logic comprises a weighting unit to attribute a weight to at least one of the S2 core events before adding the S2 core events. Thus, the core events may be weighted according to their influence on electrical current consumption.

According to another embodiment of the processor, the core power management logic comprises a selector for selecting S4 consecutive bits of the dIPC core cycle value stored in the dIPC core cycle register or the sum of the dIPC core cycle values stored in the core dIPC value register for obtaining the core dIPC value. The sum of the dIPC core cycle values may only deviate slightly from an average value from timeframe to timeframe. Selecting only S4 consecutive bits may allow to detect these small deviations without the need to consider all the further bits in further signal processing. Hence, the surface for connecting lines may be saved.

In a further embodiment of the processor, the core power management logic comprises a configurable dIPC value selection register for selecting which consecutive S4 bits of the dIPC core cycle value stored in the dIPC core cycle register or the sum of the dIPC core cycle values stored in the core dIPC value register are selected. The average value of the sum of the dIPC core cycle values may change depending on the computer, which comprises the processor. The configurable dIPC value selection register may allow adapting the processor to this change.

Moreover, in an embodiment of the processor, the core power management logic comprises an overflow handler for performing overflow handling before outputting the core dIPC value. The value of the sum of the core cycle values may deviate more than expected from the average sum of the core cycle values. An overflow handler for performing overflow handling may reduce the risk that high values of the sum of the core cycle values accidently lead to a small core dIPC value.

A method for managing a processor, wherein the processor comprises a common supply rail and one or more processor cores being connected to the common supply rail, comprising generating for each processor core a dIPC value indicative of an activity level of the respective processor core; deriving a current global dIPC value from the dIPC values of the one or more processor cores; calculating the absolute difference of the current global dIPC value and an average global historic dIPC value; comparing the absolute difference of the current global dIPC value and the average global historic dIPC value with a threshold global dIPC value; and triggering a threshold signal if the absolute difference of the current global dIPC value and the average global historic dIPC value is above the threshold global dIPC value may reduce voltage droops in the common supply rail.

In an embodiment, the method comprises adding the dIPC values of the cores to obtain the current global dIPC value.

In a further embodiment, the method comprises calculating the average global historic dIPC value based on at least two, in particular consecutive, global historic dIPC values.

A further embodiment relates to a method for managing a processor with a plurality of cores sharing a common supply rail of the processor, wherein the method comprises periodically sampling, by each core, the number of instructions executed in three consecutive time windows and determining an activity level of low, medium, high for each time window in dependence to expected minimum to maximum numbers of instructions, generating, by the processor, a sudden burst signal per core when the activity levels for the consecutive time windows of the respective core are either high, low, high or low, med, high in order of time, responsive to the processor generating a sudden burst signal for at least two cores, limiting, by the processor, the logical operations executed on the plurality of cores during a lower activity period to a level of logical operations set between the low level and the medium level, and responsive to the lower activity period ending, gradually decreasing, by the processor, the limit on the logical operations executed on the plurality of cores to resume normal operations.

FIG. 1 shows a processor 101 comprising eight processor cores 102 to 109 and a nest 110 providing the common infrastructure for the eight cores 102 to 109. The eight processor cores 102 to 109 are connected to a common supply rail, which is not shown in FIG. 1. Each processor core 102 to 109 has outputs 111 to 118, respectively, for outputting a dIPC value and a core idle state value as well as an input 119 to 126, respectively, for inputting a core throttling signal. The nest 110 comprises a chip power management logic 127 having inputs 128 to 135 for inputting the dIPC value and a core idle state value provided by the outputs 111 to 118 of the respective processor core 102 to 109. Moreover, the chip power management logic 127 includes outputs 136 to 143 for outputting a core throttling signal to the inputs 119 to 126 of the processor cores 102 to 109. The core dIPC value may be a $2^n$ bit value, in particular a 4 bit value, and the core throttling signal may be a $2^m$ bit value, wherein m is less than n, in particular a 1 bit value. The selection of a 4 bit dIPC value may be a good compromise between more analysing capacity within the chip power management logic 127 and less consumption of the valuable chip surface due to the necessary conducting paths. The core idle state value may be a 1 bit value indicating whether the respective core 102 to 109 is considered to be in an idle state or not. Each processor core 102 to 109 may include a core unit 144 to 151 and a chip power management logic 152 to 159. Each chip power management logic 152 to 159 comprises an input 160 to 167 for inputting core events and an output 168 to 175 for outputting a suspend signal.

Figure 2:
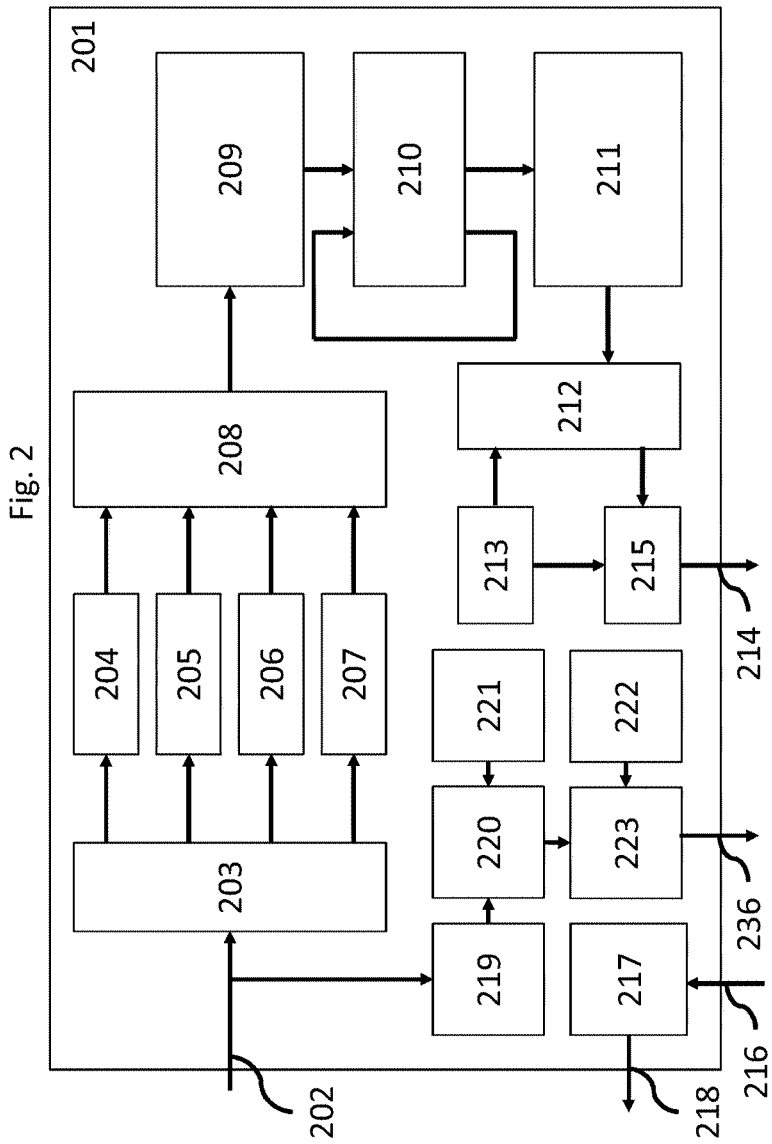
FIG. 2 shows an embodiment of a core power management logic.

FIG. 2 shows a core power management unit 201, which may be used as a core power management unit 152 to 159, in greater detail. The core power management unit 201 comprises an input 202 for inputting S1 core events indicative if a certain type of instruction is executed by the core unit attributed to the core power management unit 201. The selection of S1=15 different types of instructions may allow for a good power management while reducing the communication paths from the core unit to the core power management unit 201.

The S1 different core events may have a different influence on, for example, power consumption, power grid noise and/or heat dissipation. The core power management unit 201 may thus further include a selector 203 for selecting S2 of the S1 core events for further processing. In the implementation shown in FIG. 2 S2=4 events may be selected for further processing. The selector 203 may also be reconfigurable to change the S2 core events to be selected for further processing.

Furthermore, a weight may be attributed to each of the selected S2 of S1 core events through weighting units 204 to 207 indicative of the influence of the selected core event on, for example, power consumption, heat dissipation and/or grid noise, in particular voltage droops. The weight may be in particular an unsigned value to facilitate further calculation, more particularly an unsigned 4-bit value. A weighted core event adder 208 may be used to add the weighted core events together and to obtain a single dIPC core cycle value for each core unit cycle, which may be temporarily stored in a dIPC core cycle register 209.

An adder 210 and a core dIPC value register 211 may be used to sum up the dIPC core cycle value over a configurable number of cycle times S3. Having reached the predetermined number of cycle times S3, all bits of the core dIPC value register 211 may be reset to zero. The core dIPC value register 211 may be a 22-bit register. S3 may be selected to be above 32 and/or below 128. When using processor cores normally operating at 4.8 GHz and using S3=50, the dIPC core cycle values may be summed up over a time period of about 10.4 ns. S3 may also be chosen to be 100 for a processor core normally operating at 4.8 GHz such that the dIPC core cycle values may be summed up over a time period of about 20.8 ns.

A selector 212 may be provided to select S4 consecutive bits of the core dIPC value register 211 based on a reconfigurable dIPC value selection register 213 and to output the S4 consecutive bits as dIPC value at an output 214 of the core power management logic 201. Furthermore, the core power management logic 201 may comprise an overflow handler 215. The overflow handler 214 may force the dIPC value provided at the output 214 to adopt a maximum value.

Additionally, the core power management logic 201 includes an idle state detecting unit 219. The idle state detecting unit 219 receives S6 of the S1 core events from the input 202 and emits a signal if none of the S6 events has occurred, i.e. the idle state detecting unit 219 behaves as a "NOT OR"-gate. The emitted signal is summed above by an idle state counter 220 for a time determined by a configurable idle state config register 221, i.e. for a predetermined number of cycles. The idle state counter 220 may be a 10-bit counter and the idle state config register 221 may be a 10-bit config register. An adder 223 then emits depending on the value in a configurable idle exit register 222 the core idle state value, i.e. zero or one to the output 236 for further processing by a chip power management logic. Finally, the core power management logic 201 may include an input 216 for inputting a core throttling signal, a performance throttling unit 217 responsive to the core throttling signal and an output 218 for outputting a suspend signal to a core unit (not shown), in particular a core unit 144 to 151 as shown in FIG. 1.

Figure 3:
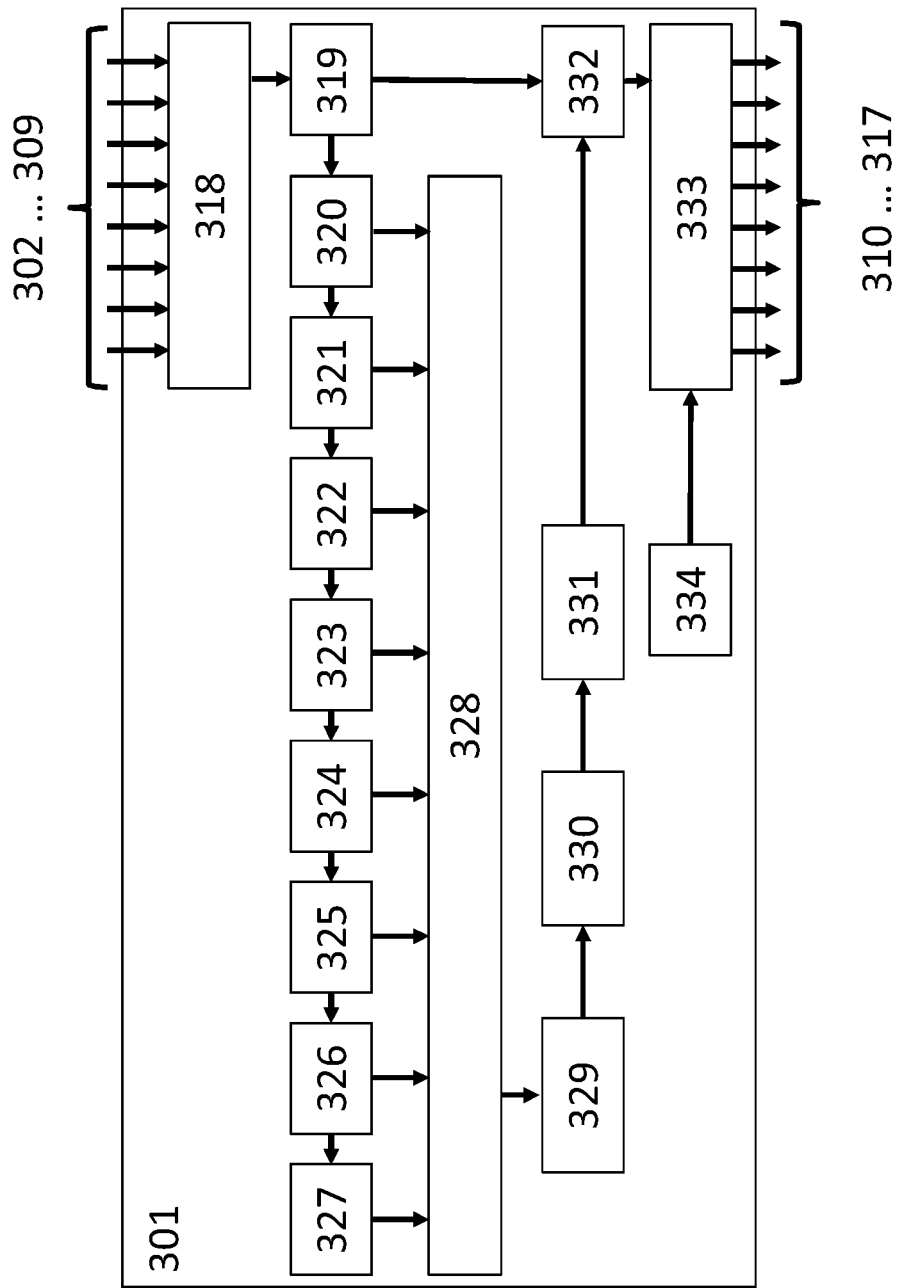
FIG. 3 shows an embodiment of a chip power management logic.

FIG. 3 shows a chip power management logic 301. The chip power management logic 301 comprises inputs 302 to 309 for inputting core dIPC values from processor cores and outputs 310 to 317 for outputting throttling signals to the processor cores.

The chip power management logic 301 may further comprise an adder 318 for adding the core dIPC values together and to obtain a current global dIPC value. Said current global dIPC value may be stored in a chip dIPC value register 319. Moreover, S5 historic global dIPC value registers 320 to 327 may be provided to store the S5 historic global dIPC values for the S5 preceding time periods. The S5 historic global dIPC values may be summed up by a further adder 328 and the sum may be stored in a chip dIPC history register 329. A divisor 330 may be provided for dividing the sum by S5 to obtain an average historic global dIPC value, wherein said average historic global dIPC value may be stored in an average historic global dIPC register 331. Using S5=$2^\circ$, in particular S5=$2^3$=8, may allow for a simpler hardware implementation of the divisor 330.

The chip power management logic 301 may further comprise a subtractor 332 to calculate the absolute difference, i.e. the delta, between the average historic global dIPC value and the current global dIPC value. A magnitude comparator 333 serves to compare this absolute difference with a dIPC threshold value stored in a chip dIPC threshold register 334. The chip dIPC threshold register 334 may be configurable to adjust the dIPC threshold value stored therein. If the absolute difference is greater than the dIPC threshold value, the magnitude comparator 333 may output a core throttling signal at the outputs 310 to 317.

Figure 4:
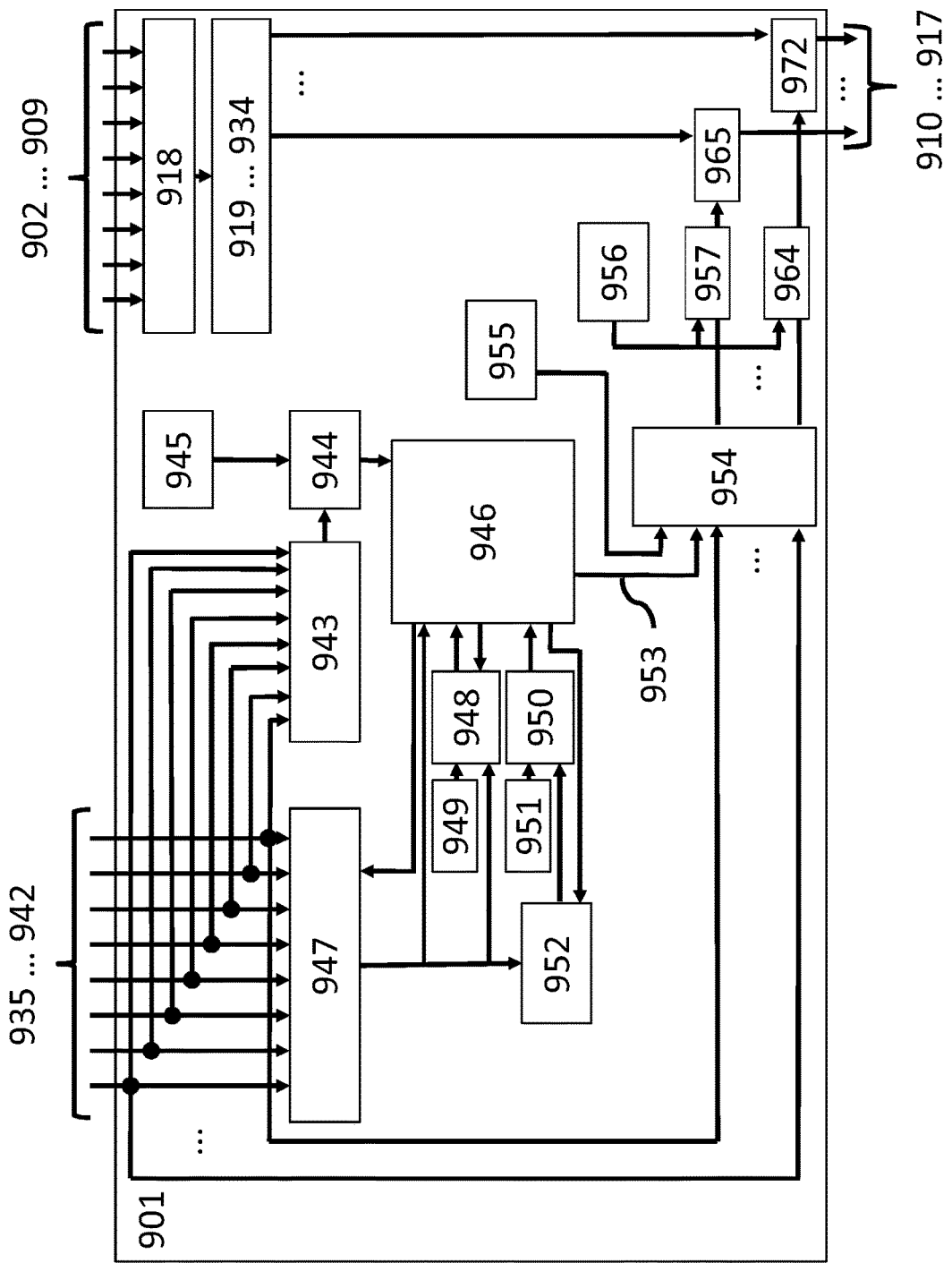
FIG. 4 shows an embodiment of a chip power management logic.

FIG. 4 shows a chip power management unit 901 of a processor comprising at least two processor cores. The elements 902 to 934 and their function correspond to elements 302 to 334 described with reference to FIG. 3. The chip power management unit 901 comprises additional inputs 935 to 942 for inputting a core idle state signal from the (e.g. eight) processor cores. The core idle state signals indicate to the chip power management unit 901 if the respective processor core is in the idle state as a one bit core idle state value.

The chip power management unit 901 further comprises a summing unit 943 summing the idle state values to obtain an idle state value sum. A comparing unit 944 compares said idle state value sum with the threshold idle state value sum stored in a configurable threshold idle state value sum register 945. If the idle state value sum is greater than or equal to the threshold idle state value sum, the comparing unit 944 emits an arm signal to the control unit 946. The core idle state signals are furthermore processed by a detecting unit 947, which emits a number of cores left idle signal representative of the number of cores having left the idle state. The number of cores left idle signal is transmitted to a control unit 946, which may be represented as finite-state machine, a window counter 948 and a summing unit 949.

Upon receipt of the first number of cores left idle signal starts to count down for every cycle from a value determined by the configurable window size register 949. The window counter 948 and the window size register 950 may have a seven bit width. If the window counter 948 reaches zero, it emits a signal to the control unit 946. The summing unit 952 sums up the number of cores left idle signal in consecutive cycles. A comparing unit 950 compares said sum with a threshold idle state exit number stored in a threshold idle state exit number register 951 and emits a signal to the control unit 946 if the sum is greater than or equal to the threshold idle state exit number.

The summing unit 952 and the threshold idle state exit number register 951 may have a bit width, which is lower than the bit width of the window counter 948 and/or the window size register 949. The bit width of the summing unit 952 and the threshold idle state exit number register 951 may in particular 3 bits. The control unit 946 comprises outputs for resetting the detecting unit 947, the window counter 948 and the summing unit 952. Upon receipt of a resetting signal, the detecting unit 947 is reset to zero, the window counter 948 to the value stored in the window size register 949 and the summing unit 952 to zero. Moreover, the control unit 946 comprises an output for outputting an idle state throttling signal to a chip throttling unit 954. Based on the core idle state signals, a mask stored in a checker board 955 and the idle state throttling signal 953 the chip throttling unit 954 emits core throttling signals to the respective processor cores.

A configurable enable idle state exit register 956 and adding units 957 to 964 allow selecting, which of the throttling mechanism due to idle state exits shall be activated. Generally, it is possible to emit the throttling signal directly to the respective processor cores via outputs 910 and 917. In the example shown in FIG. 4, OR-gates 965 to 972 pass a throttling signal to the processor cores if either the dIPC logic described with reference to FIG. 3 determines that throttling is necessary to avoid a voltage droop or throttling is desirable due to too many processor cores leaving the idle state. Hence, the same throttling mechanism on a core level may be used.

FIG. 5 shows a method, which may be performed by the control unit 946. In step 1101, it is determined whether a signal is received from the detecting unit 947. If so, the control unit 946 enters an armed mode 1102. If not, the step 1101 is repeated. If in step 1102 a signal is received from the detecting unit 947, the control unit 946 triggers the idle state throttling signal in step 1103 and sends reset signals to the detecting unit 947, the window counter 948 and the summing unit 952. If not, it is determined in step 1104 if a signal is received from the window counter 948. If so, the control unit 946 performs the reset step 1100. If not, the control unit 946 resumes with step 1102.

Alternatively or in addition, the control unit 946 may directly transmit an idle state throttling signal when a signal is received from the comparing unit 944.

The two diagrams according to FIG. 6 show the development of common supply rail voltage V (lower diagram) in response to common supply rail current I (upper diagram) and over time t. Depending on processor core activity, the common supply rail current I, which has to be provided to the processor cores, may change rapidly (upper diagram, solid line) from, for example, ΔI 150 A to 300 V, or in, for example, steps of Δt, wherein Δt may amount to 10 ns (upper diagram, dashed line). Said rapid change in common supply rail current I may lead to a voltage droop of, for example, $\Delta V_1 = 110$ mV with respect to a nominal voltage of $V_{DD} = 1.16$ V (lower diagram, solid line), and said step-like change to a voltage droop of, for example, $\Delta V_2 = 90$ mV with respect to a nominal voltage of $V_{DD} = 1.16$ V. Reducing the slope of common supply rail current I reduces voltage droops. Thus, lesser voltage guard band may be necessary and the operating frequency of the processor and thus its performance may be increased.

Figures 7, 8:
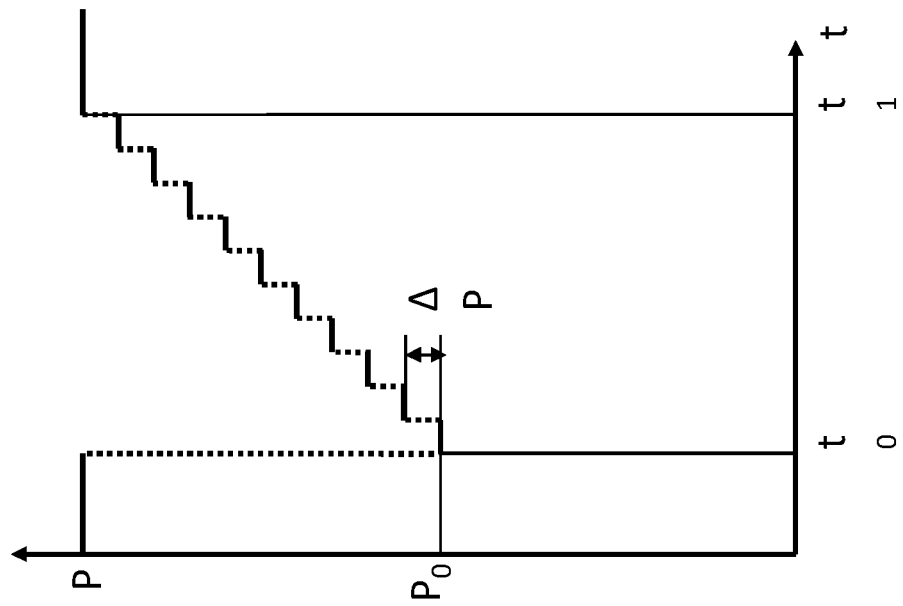
FIG. 7 shows an exemplary throttling method.
FIG. 8 shows an exemplary suspend pattern.

FIG. 7 shows the development of the performance level P in percent over time, which may be implemented in a performance throttling unit, for example the performance throttling unit 217, triggered by a core throttle signal. Upon receipt of a core throttle signal at $t=t_0$, the performance level may be reduced to an initial throttle level $P_0$. The initial throttle level $P_0$ may be selected to be 7/16 of the unthrottled performance level. If no further throttle signal is received within a period Δt, the performance level may be augmented by an amount ΔP again. Said step is repeated until the unthrottled state is reached again or another core throttle signal is received.

FIG. 8 shows a pattern of suspend signals which may be provided by a performance throttle unit to a core unit to obtain a desired performance level.

The flowchart of FIG. 9 may illustrate a method for managing a processor, wherein the processor comprises a common supply rail and one or more processor cores, which are connected to the common supply rail. In a step 701, for each processor core a dIPC value indicative of an activity level of the respective processor core is a generated. From the generated dIPC values of the processor cores, a current global dIPC value may be derived in step 702. The absolute difference, i.e. the un-signed difference, of the current global dIPC value and an average global historic dIPC value may be calculated in step 703. The average global historic dIPC value may be an average of former global dIPC values. The average may be a mode, i.e. the value that appears the most often, a median, i.e. the numerical value separating the higher half from the lower half, or a Pythagorean mean, in particular an arithmetic mean, a geometric mean or a harmonic mean, of the former global dIPC values. If the average global historic dIPC value of more than one global historic dIPC value is calculated, the different singular global historic dIPC values may be weighted with different weighting factors. Accordingly, the youngest and/or oldest of the former global dIPC values may have a stronger influence on the average global historic dIPC value.

FIG. 10 discloses a further processor 1001 comprising processor cores 1002 to 1009. Each processor core 1002 to 1009 has a core power management logic 1010 to 1017 comprising a mask register 1018 to 1025, a decision unit 1026 to 1043, inputs 1021 to 1034 for receiving a common clock signal, inputs 1042 to 1049 for receiving an asynchronous wake signal, i.e. an idle state exit, and outputs 1050 to 1057 for outputting synchronous wake signals, i.e. a resume signal. The clock signal inputted via the inputs 1034 to 1041 may be a clock signal proprietary to the processor 1001 or a global system wide clock signal. Such a clock signal may be used to reduce constraints relates to several processors.

Upon reception of a first clock signal, a decision unit 1026 to 1033, which may be configured as an adder, of each core power management logic 1010 to 1017 determines whether an asynchronous wake signal is applied to the respective input 1042 to 1049 and whether the mask register 1018 to 1025 has a bit set at the first index position. Only if both conditions are fulfilled, a synchronous wake signal is outputted at the respective output 1050 to 1057. Upon reception of the next clock signal, the next index position of the mask register 1018 to 1025 is assessed and so on, until the last index position of the mask register 1018 to 1025 is reached and the process resumes with the first index position of the mask register 1018 to 1025. In the example depicted in FIG. 10, the bit widths of the mask registers 1018 to 1025 registers correspond to the number of processor cores, i.e. the mask registers 1018 to 1025 are 8-bit registers. Such a bit width makes configuration of the mask registers particularly easy because for each processor core it may be determined very easily if said processor core may leave the idle state in a specific clock cycle or if said processor core may not leave the idle state. However, the bit width of the mask registers 1018 to 1025 may also deviate from the number of processor cores.

In the example, only one processor core may leave the idle state in a specific clock cycle. However, it is also possible to configure the mask register in a way that a number of processor cores may leave the idle state at the same time. It may, for example, be possible to allow non-neighbouring cores to leave the idle state at the same clock cycle. Furthermore, the mask registers 1018 to 1025 may also be configured to indicate only when a processor core may not leave the idle state, and the decision unit 1027 to 1035 may be adapted thereto. For example, such a core power management logic 1010 to 1017 may avoid that neighbouring processor cores leave the idle state at essentially the same time.

Thus, it has been shown that the processor 1001 may detect idle state exits indicated by core units with its inputs 1042 to 1049 and delay a command execution of at least one of the core units indicating an idle state exit when the number of idle state exits exceeds a predetermined threshold idle state exit number, via its mask registers 1018 to 1025 and the corresponding decision units 1026 to 1033. Accordingly, if more than a predetermined number of processor core leave an idle state, leaving the idle state is delayed for at least one of said processor cores 1002 to 1009. In particular, leaving the idle state is delayed until the mask register 1018 to 1025 of the respective processor core 1002 to 1009 allows the transmission of the wake signal.

According to another aspect, a processor comprises processor cores connected to a common supply rail, wherein the processor cores are grouped in sets of two or more processor cores. Within each set, a priority encoder is provided having inputs for receiving idle state exit requests from the processor cores and having outputs for granting idle state exits. The priority encoder may ensure that if one or more processor core(s) of the set leaves the idle state the other processor cores are momentarily locked out. The processor cores may turn off their wakeup signal after a fixed delay, which may be set per processor core by a centralized controller.

What is claimed is:

1. A method for managing a processor, the processor comprising a common supply rail and processor cores being connected to the common supply rail, wherein each processor core comprises a core unit, wherein the method comprises:
   determining, by a chip power management unit of the processor, for each processor core if the processor core is currently in an idle state, wherein the chip power management unit is external to the core units;
   maintaining, by the chip power management unit based on the determining, an idle state count indicating a number of processor cores currently in the idle state;
   entering, by the chip power management unit, an armed mode when the idle state count indicates exceeds an idle state count threshold, wherein the armed mode places the chip power management unit in a state where the chip power management unit is ready to delay command execution by one or more of the core units after they exit the idle state;
   detecting, by the chip power management unit, idle state exits indicated by the core units;
   maintaining, by the chip power management unit based on the detecting, an idle state exit count indicating a number of processor cores that have exited the idle state;
   delaying, by the chip power management unit, a command execution of at least one of the core units indicating an idle state exit when the idle state exit count exceeds an idle state exit count threshold when the chip power management unit is in the armed mode; and
   leaving, by the chip power management unit, the armed mode when the idle state count is less than the idle state count threshold.

2. The method according to claim 1, wherein detecting idle state exits indicated by the core units comprises detecting idle state exits indicated by the core units within a window of a predetermined number of clock cycles, and
   wherein delaying the command execution of at least one of the core units comprises delaying a command execution of at least one of the core units indicating an idle state exit within the window when the number of idle state exits exceeds idle state exit count threshold.

3. The method according to claim 2, comprising:
   detecting idle state exits indicated by the core units within a consecutive window of the predetermined number of clock cycles; and
   delaying the command execution of at least one of the core units indicating an idle state exit within the consecutive window when the number of idle state exits exceeds idle state exit count threshold.

4. The method according to claim 1, wherein delaying comprises throttling the command execution.

5. The method according to claim 1, wherein delaying comprises postponing the command execution.

6. A processor comprising:
- a common supply rail;
- processor cores sharing the common supply rail;
- a chip power management unit external to the processor cores;
- outputs to output idle state values; and
- inputs to input a core throttling signal, wherein the chip power management unit is configured to:
- determine for each processor core if the processor core is currently in an idle state, wherein the chip power management unit is external to the core units;
- maintain, based on the determining, an idle state count indicating a number of processor cores currently in the idle state;
- enter an armed mode when the idle state count indicates exceeds an idle state count threshold, wherein the armed mode places the chip power management unit in a state where the chip power management unit is ready to delay command execution by one or more of the core units after they exit the idle state;
- detect idle state exits indicated by the core units, wherein an idle state exits indicates that a corresponding core unit has left the idle state;
- maintain, based on the detecting, an idle state exit count indicating a number of processor cores that have left the idle state;
- delay a command execution of at least one of the core units indicating an idle state exit the idle state exit count exceeds an idle state exit count threshold idle state when the chip power management unit is in the armed mode; and
- leave the armed when the idle state count is less than the idle state count threshold.

7. The processor according to claim 6, wherein each processor core comprises a core power management logic, wherein the core power management logic comprises
- inputs to input a first given number of core events,
- an idle state detecting unit to receive a second given number of the first given number of core events and to emit a signal if none of the second given number core events has occurred.

8. The processor according to claim 7, wherein the core power management logic comprises a configurable idle state exit register to turn on or off outputting an idle state value.

9. The processor according to claim 7, wherein the core power management logic comprises an idle state counter to sum up the signal for a predetermined number of cycles.

10. The processor according to any one of claim 6, wherein the chip power management unit comprises
- inputs to input idle state values,
- a control unit to output an idle state throttling signal based on the idle state values, and
- outputs to output core throttling signals to the processor cores.

11. The processor according to claim 10, wherein the chip power management unit comprises
- a detecting unit for detecting a first idle state exit,
- a window counter, and
- a summing unit to sum idle state exits during a window of predetermined number of clock cycles.

12. The processor according to claim 6, wherein the processor comprises
- an idle state exit register, and
- adding units to activate and deactivate a throttling mechanism due to idle state exits.

13. A processor comprising a common supply rail, at least two processor cores connected to the common supply rail, and a chip power management unit external to the at least two cores, wherein the at least two processor cores comprise core power management units comprising a mask register, a decision unit, an input for inputting an idle state exit, an input for a common clock signal, an output for outputting a resume signal, the processor to:
- determine, by the chip power management unit, for each of the at least two processor cores if the processor core is currently in an idle state;
- maintain, by the chip power management unit based on the determining, an idle state count indicating a number of processor cores currently in the idle state;
- enter, by the chip power management unit, an armed mode when the idle state count indicates exceeds an idle state count threshold, wherein the armed mode places the chip power management unit in a state where the chip power management unit is ready to delay command execution by one or more of the core units after they exit the idle state;
- detect, by the chip power management unit, idle state exits indicated by the at least two processor cores;
- maintain, by the chip power management unit based on the detecting, an idle state exit count indicating a number of processor cores that have exited the idle state;
- delay, by the chip power management unit, a command execution of at least one of the at least two processor cores indicating an idle state exit when the idle state exit count exceeds an idle state exit count threshold when the chip power management unit is in the armed mode; and
- leave, by the chip power management unit, the armed mode when the idle state count is less than the idle state count threshold.

14. The processor according to claim 13, wherein detecting idle state exits indicated by the at least two processor cores comprises detecting idle state exits indicated by the core units within a window of a predetermined number of clock cycles, and
wherein delaying a command execution of at least one of the core units comprises delaying a command execution of at least one of the core units indicating an idle state exit within the window when the number of idle state exits exceeds a predetermined threshold idle state exit number.

15. The processor according to claim 14, wherein the processor is further to:
- detect idle state exits indicated by the at least two processor cores within a consecutive window of the predetermined number of clock cycles; and
- delay a command execution of at least one of the at least two processor cores indicating an idle state exit within the consecutive window when the number of idle state exits exceeds a predetermined threshold idle state exit number.

16. The processor according to claim 13, wherein delaying comprises throttling the command execution.

17. The processor according to claim 13, wherein delaying comprises postponing the command execution.

* * * * *